United States Patent
Dzimitowicz

(10) Patent No.: US 11,065,999 B2
(45) Date of Patent: Jul. 20, 2021

(54) LIFTGATE ALERT APPARATUS

(71) Applicant: John Dzimitowicz, Palos Heights, IL (US)

(72) Inventor: John Dzimitowicz, Palos Heights, IL (US)

( * ) Notice: Subject to any disclaimer, the term of this patent is extended or adjusted under 35 U.S.C. 154(b) by 63 days.

(21) Appl. No.: 16/710,459

(22) Filed: Dec. 11, 2019

(65) Prior Publication Data

US 2021/0178955 A1   Jun. 17, 2021

(51) Int. Cl.
| | | |
|---|---|---|
| *B60P 1/44* | (2006.01) | |
| *B62D 33/04* | (2006.01) | |
| *B60Q 9/00* | (2006.01) | |
| *B60Q 5/00* | (2006.01) | |
| *B60Q 1/30* | (2006.01) | |
| *B60T 13/24* | (2006.01) | |

(52) U.S. Cl.
CPC ........... *B60P 1/4464* (2013.01); *B60P 1/4478* (2013.01); *B60P 1/4485* (2013.01); *B60Q 1/305* (2013.01); *B60Q 5/005* (2013.01); *B60Q 9/00* (2013.01); *B62D 33/04* (2013.01); *B60R 2300/808* (2013.01); *B60T 13/24* (2013.01)

(58) Field of Classification Search
CPC ..... B60P 1/4464; B60P 1/4478; B60P 1/4485; B60Q 9/00; B60Q 5/005; B60Q 1/305; B62D 33/04; B60T 13/24; B60R 2300/808
USPC .......................................................... 340/431
See application file for complete search history.

(56) References Cited

U.S. PATENT DOCUMENTS

| | | | | |
|---|---|---|---|---|
| 3,789,357 | A | * | 1/1974 | Fritz, Jr. ................. B60P 1/283 180/286 |
| 4,072,925 | A | * | 2/1978 | Yashima ............... G07C 5/0816 340/461 |
| 4,855,709 | A | * | 8/1989 | Naderi ................ B60R 16/0232 340/438 |
| 5,394,137 | A | * | 2/1995 | Orschek ................ B60T 17/221 188/1.11 E |
| 5,513,943 | A | | 5/1996 | Lugash |
| 6,065,423 | A | | 5/2000 | Hensel |
| 6,137,419 | A | | 10/2000 | Lennox |
| 6,727,806 | B1 | | 4/2004 | Massie |
| 9,669,749 | B2 | | 6/2017 | Walker |
| D791,666 | S | | 7/2017 | Denton |
| 2017/0305323 | A1 | | 10/2017 | Marji |

FOREIGN PATENT DOCUMENTS

WO   WO2016040183   3/2016

* cited by examiner

*Primary Examiner* — Adnan Aziz

(57) ABSTRACT

A liftgate alert apparatus for alerting drivers when a liftgate is down before driving includes a pressure switch configured to be coupled to an air line of an airbrake system of a truck or a trailer. The pressure switch is closed when the airbrake system is activated. A roller switch is in operational communication with the pressure switch and is configured to be coupled to a liftgate. The roller switch is closed when the liftgate is in a down position. An alarm is in operational communication with the pressure switch, the roller switch, and a power source. The alarm has an alarm ground wire. The alarm is configured to be coupled within a cab of the truck or on a front end of the trailer and activates an audio and or visual alert when both the pressure switch and the roller switch are closed.

8 Claims, 4 Drawing Sheets

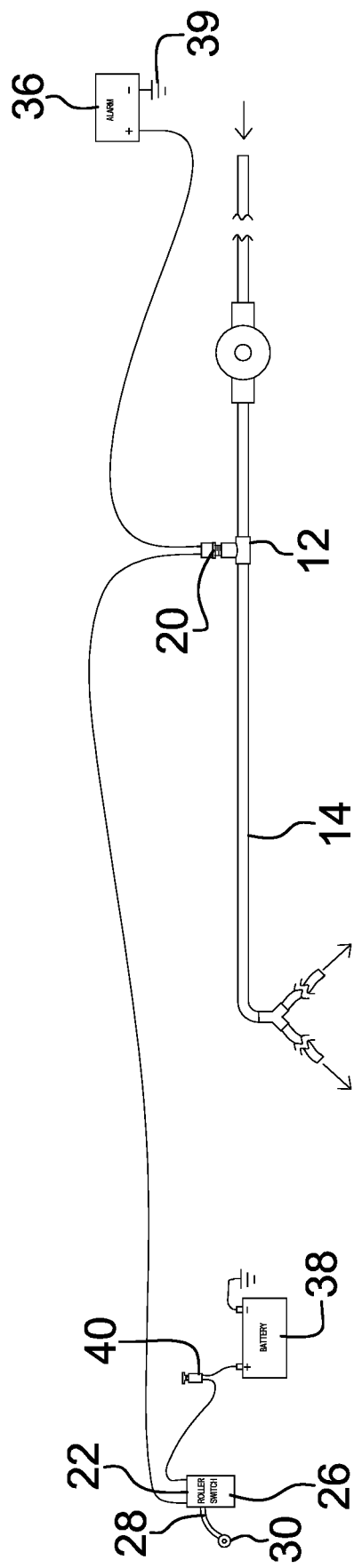
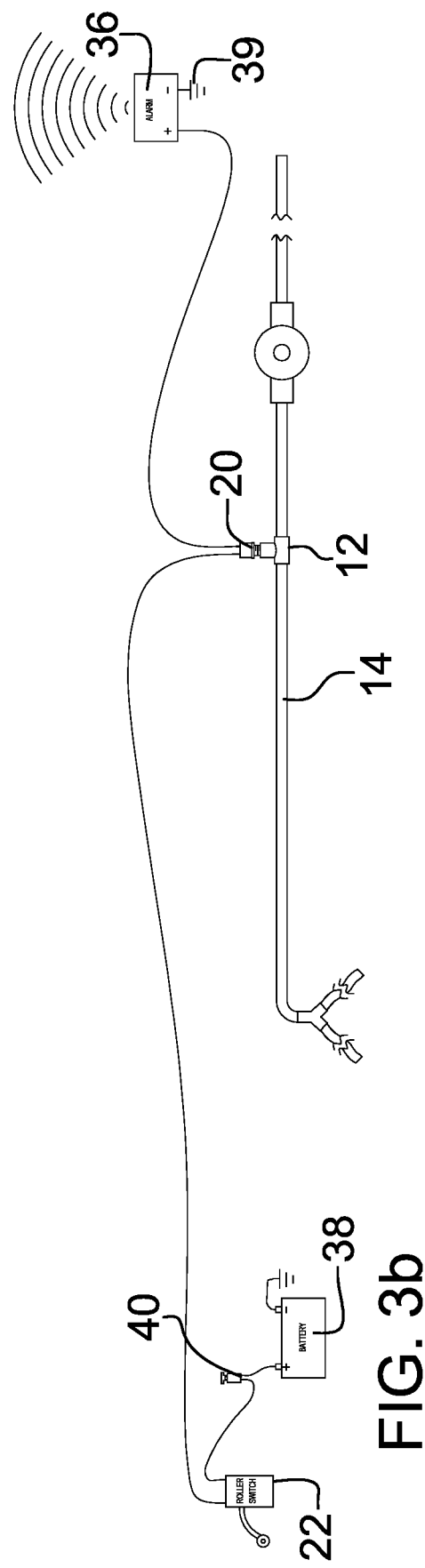
FIG. 3a
FIG. 3b

LIFTGATE ALERT APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to trucking safety devices and more particularly pertains to a new trucking safety device for alerting drivers when a liftgate is down before driving.

(2) Description of Related Art Including Information Disclosed Under 37 CFR 1.97 and 1.98

The prior art relates to trucking safety devices.

BRIEF SUMMARY OF THE INVENTION

An embodiment of the disclosure meets the needs presented above by generally comprising a pressure switch configured to be coupled to an air line of an airbrake system of a trailer. The trailer may be integrated as part of a truck or may be towable. The pressure switch is closed when the airbrake system is activated. A roller switch is in operational communication with the pressure switch and is configured to be coupled to a liftgate of the trailer. The roller switch is closed when the liftgate is in a down position. An alarm is in operational communication with the pressure switch, the roller switch, and a liftgate battery of the liftgate or a truck battery. The alarm has an alarm ground wire. The alarm is configured to be coupled within a cab of the truck or on a front end of the trailer and activates an audio and or visual alert when both the pressure switch and the roller switch are closed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3a is a diagram of an embodiment of the disclosure.

FIG. 3b is a diagram of an embodiment of the disclosure.

DETAILED DESCRIPTION OF THE INVENTION

Figure 1:
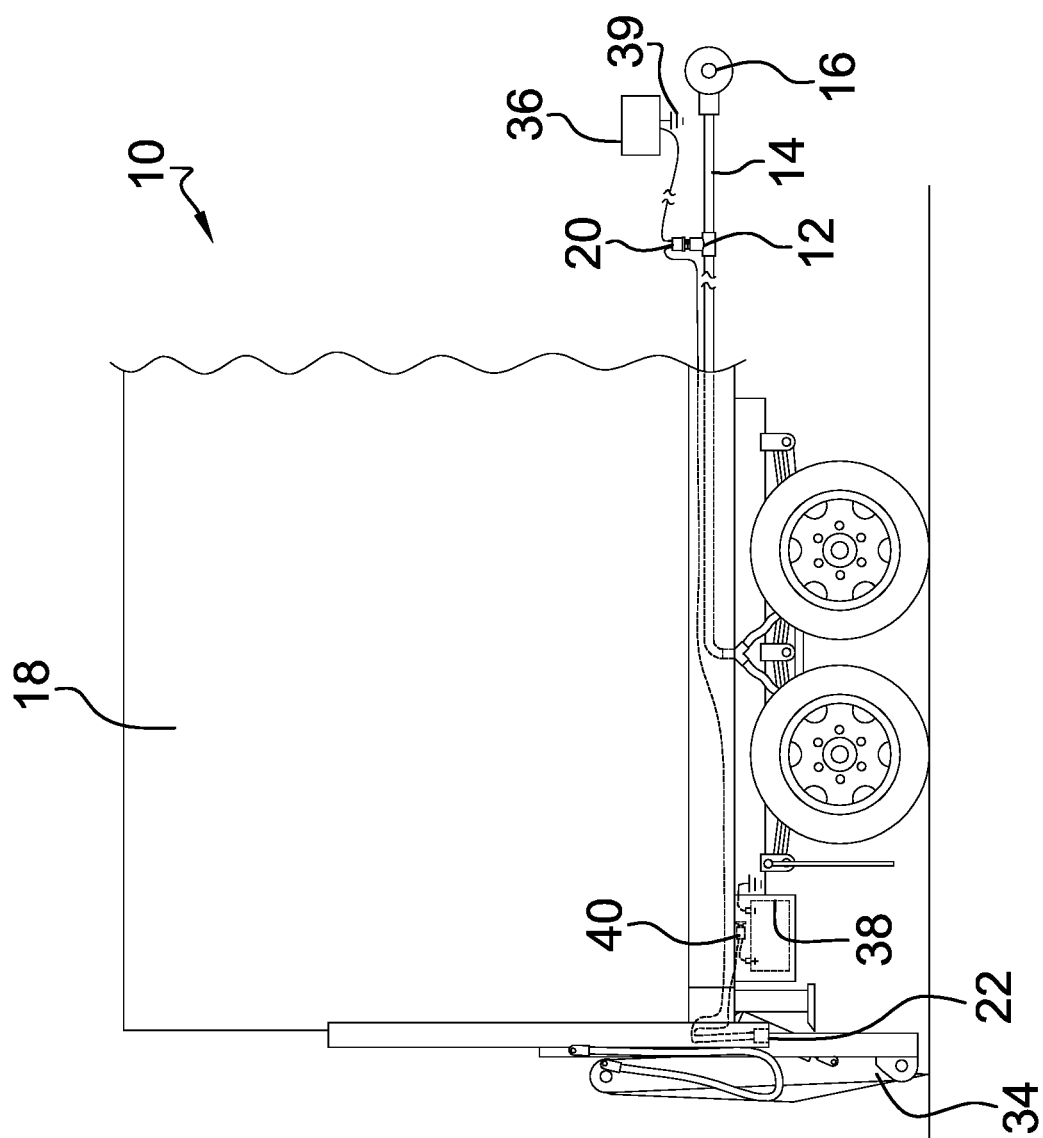
FIG. 1 is a side elevation view of a liftgate alert apparatus according to an embodiment of the disclosure.
Figure 2:
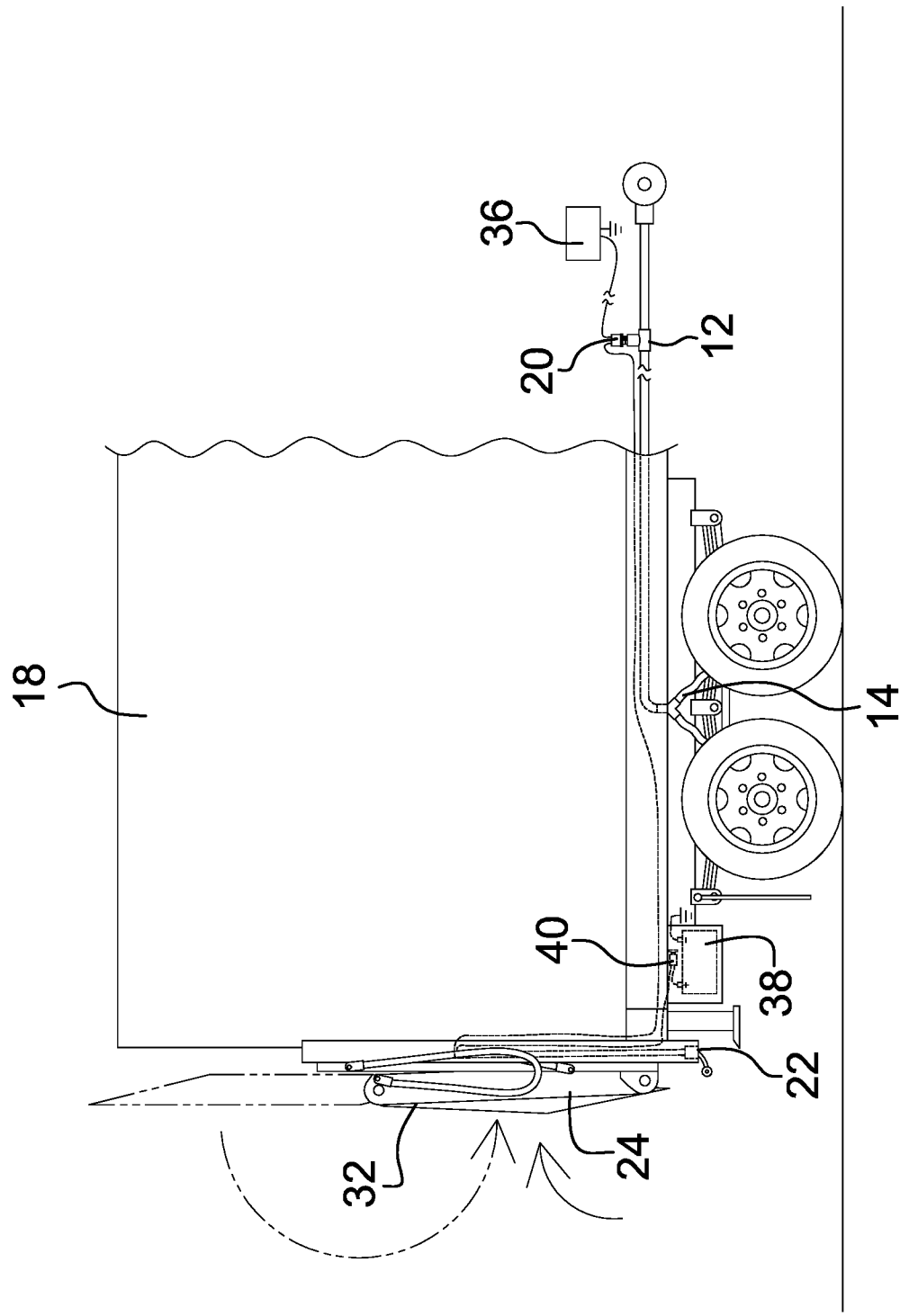
FIG. 2 is an in-use view of an embodiment of the disclosure.
Figure 4:
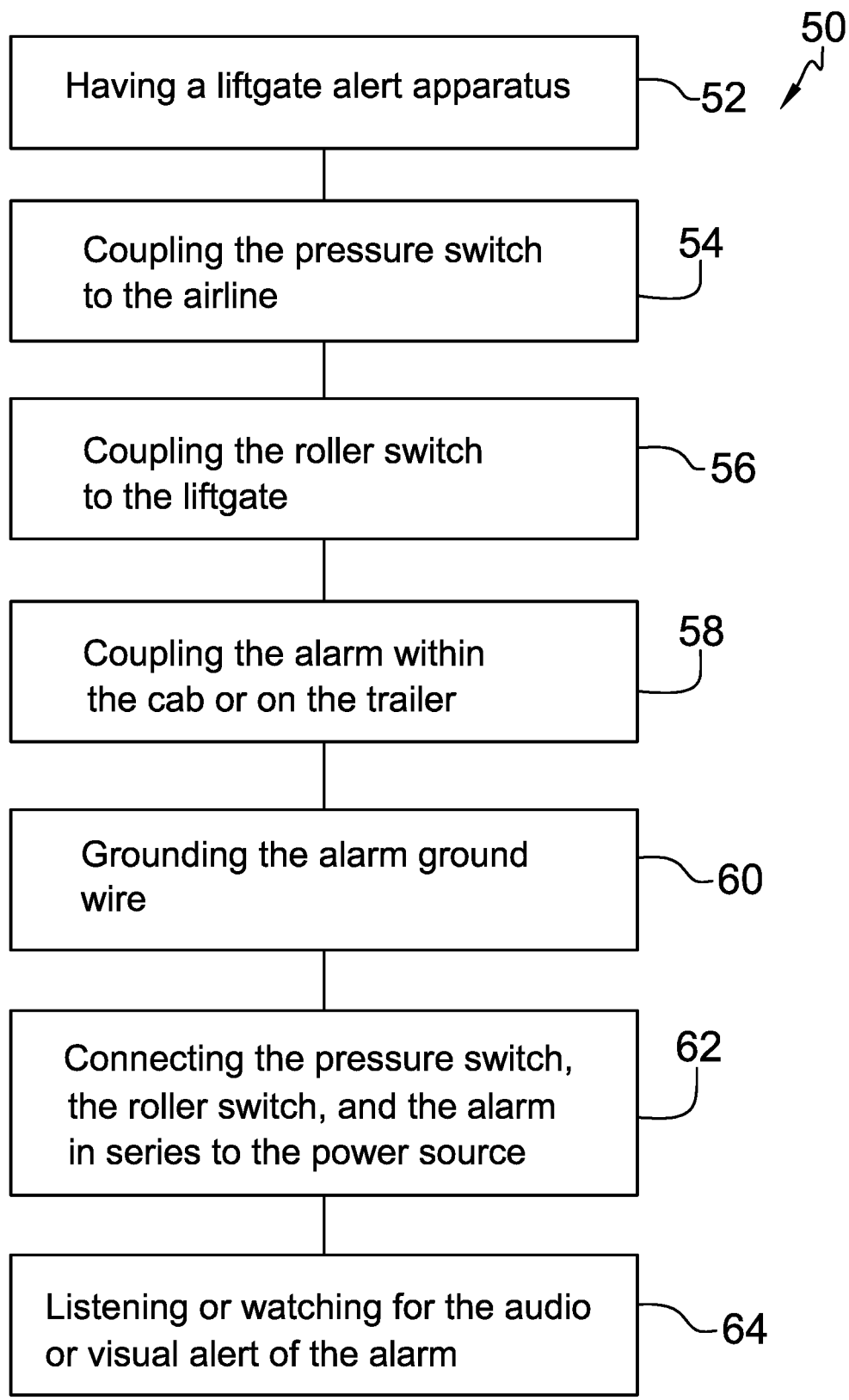
FIG. 4 is a block diagram of a method of utilizing an embodiment of the disclosure.

With reference now to the drawings, and in particular to FIGS. 1 through 5 thereof, a new trucking safety device embodying the principles and concepts of an embodiment of the disclosure and generally designated by the reference numeral 10 will be described.

As best illustrated in FIGS. 1 through 5, the liftgate alert apparatus 10 generally comprises a T-fitting 12 configured to be coupled to an air line 14 of an airbrake system 16 of a trailer 18. The trailer 18 may be integrated as part of a truck or may be towable. The apparatus 10 ties into the existing airbrake system 16 of the trailer 18. The pressure switch 20 is coupled to the T-fitting 12 and the pressure switch 20 is closed when the airbrake system 16 is activated before a driver operates the truck. The airbrake system 16 is activated when the driver releases the parking brake and activates the service brake valve, pressure increases within the air line 14 to close the pressure switch 20. The pressure switch 20 may have a spring requiring at least 20 psi of pressure in the air line 14 in order to be closed.

A roller switch 22 is in operational communication with the pressure switch 20 and is configured to be coupled to a liftgate 24 of the trailer. The roller switch 22 has a switch body 26, an arm 28 extending from the switch body 26, and a roller 30 coupled to the arm 28. The roller 30 is configured to be in operational communication with the liftgate 24 when the liftgate 24 moves between an up position 32 and a down position 34. The roller switch 22 is closed when the liftgate 24 is in the down position 34. An alarm 36 is in operational communication with the pressure switch 20, the roller switch 22, and a power source 38. The power source 38 may be a liftgate battery 38 of the liftgate. An in-line fuse 40 may be coupled between the roller switch 22 and the battery 38. The alarm 36 is configured to be coupled within a cab of the truck or on a front end of the trailer 18. The alarm 36 has an alarm ground wire 39 that is grounded within the cab or on the trailer 18. The alarm 36 activates an audio and or visual alert when both the pressure switch 20 and the roller switch 22 are closed, alerting the driver that the liftgate 24 is in the down position 34 and the airbrake system 16 has been activated to warn the driver before operation of the truck 18. The audio alert may be at least 80 decibels and is positioned behind the driver's side so it cannot be missed.

In use, the liftgate alert apparatus 10 allows for a method of preventing liftgate damage 50. A step 52 comprises having the liftgate alert apparatus 10. A step 54 comprises coupling the pressure switch 20 to the air line 14. A step 56 comprises coupling the roller switch 22 to the liftgate 24. A step 58 comprises coupling the alarm 36 within the cab. A step 60 comprises grounding the alarm ground wire 39. A step 62 comprises connecting the pressure switch 20, the roller switch 22 and the alarm 36 in series to the liftgate battery 38. A step 64 comprises listening and or watching for the audio and or visual alert of the alarm 36 to prevent driving while the liftgate 24 is in the down position 34.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A liftgate alert apparatus comprising:
    a pressure switch, the pressure switch being configured to be coupled to an air line of an airbrake system of a trailer, the trailer being either integrated as part of a truck or being towable, the pressure switch being closed when the airbrake system is activated by a driver releasing a parking brake;
    a roller switch, the roller switch being in operational communication with the pressure switch, the roller switch being configured to be coupled to a liftgate of the trailer, the roller switch being closed when the liftgate is in a down position; and
    an alarm, the alarm being in operational communication with the pressure switch, the roller switch, and a power source, the alarm having an alarm ground wire, the alarm being configured to be coupled within a cab of the truck or to a front end of the trailer, the alarm activating an audio and or visual alert when both the pressure switch and the roller switch are closed.

2. The liftgate alert apparatus of claim 1 further comprising a T-fitting, the T-fitting being configured to be coupled to the air line of the airbrake system of the truck, the pressure switch being coupled to the T-fitting.

3. The liftgate alert apparatus of claim 1 further comprising the roller switch having a switch body, an arm extending from the switch body, and a roller coupled to the arm.

4. The liftgate alert apparatus of claim 1 further comprising the power source being either a liftgate battery of the liftgate or a truck battery of the truck.

5. A truck and liftgate alert apparatus combination comprising:
    a trailer comprising:
        a trailer body, the trailer body either being part of a truck having a cab or being towable;
        a liftgate coupled to the trailer body, the liftgate being coupled to a backside of the trailer body, the liftgate having a liftgate battery powering a hydraulic cylinder to move the liftgate between a down position and an up position; and
        an airbrake system, the airbrake system having a glad hand air line connector and an air line extending to a plurality of airbrakes coupled to a plurality of wheels of the trailer; and
    a liftgate alert apparatus, the liftgate alert apparatus comprising:
        a pressure switch, the pressure switch being coupled to the air line of the airbrake system, the pressure switch being closed when the airbrake system is activated by a driver releasing a parking brake;
        a roller switch, the roller switch being in operational communication with the pressure switch, the roller switch being coupled to the liftgate of the truck, the roller switch being closed when the liftgate is in a down position; and
        an alarm, the alarm being in operational communication with the pressure switch, the roller switch, and the liftgate battery, the alarm having an alarm ground wire, the alarm being coupled within a cab of the truck or on a front end of the trailer body, the alarm activating an audio and or visual alert when both the pressure switch and the roller switch are closed.

6. The liftgate alert apparatus of claim 5 further comprising a T-fitting, the T-fitting being configured to be coupled to the air line of the airbrake system of the truck, the pressure switch being coupled to the T-fitting.

7. The liftgate alert apparatus of claim 5 further comprising the roller switch having a switch body, an arm extending from the switch body, and a roller coupled to the arm.

8. A method of preventing liftgate damage comprising:
    having a liftgate alert apparatus, the liftgate alert apparatus comprising:
        a pressure switch, the pressure switch being configured to be coupled to an air line of an airbrake system of a trailer, the trailer being integrated as part of a truck or being towable, the pressure switch being closed when the airbrake system is activated by a driver releasing a parking brake;
        a roller switch, the roller switch being in operational communication with the pressure switch, the roller switch being configured to be coupled to a liftgate of the trailer, the roller switch being closed when the liftgate is in a down position; and
        an alarm, the alarm being in operational communication with the pressure switch, the roller switch, and a power source, the alarm having an alarm ground wire, the alarm being configured to be coupled within a cab of the truck or on a front end of the trailer, the alarm activating an audio and or visual alert when both the pressure switch and the roller switch are closed;
    coupling the pressure switch to the air line;
    coupling the roller switch to the liftgate;

coupling the alarm within the cab or on the front end of the trailer;
grounding the alarm ground wire;
connecting the pressure switch, the roller switch and the alarm in series to the power source; and
listening or watching for the audio and or visual alert of the alarm to prevent driving while the liftgate is in the down position.

\* \* \* \* \*